Dec. 12, 1939.     L. V. LANDGREEN     2,182,946

WHEEL

Filed Dec. 6, 1938

INVENTOR.
Lowell V. Landgreen
BY
F. Bascom Smith
ATTORNEY.

Patented Dec. 12, 1939

2,182,946

UNITED STATES PATENT OFFICE 2,182,946

WHEEL

Lowell V. Landgreen, Hendley, Nebr.

Application December 6, 1938, Serial No. 244,144

2 Claims. (Cl. 301—44)

This invention relates to wheels and more particularly to wheels of the type adapted for use on vehicles such as tractors, for example.

One of the objects of the present invention is to provide a novel metal wheel having removable and adjustable traction lugs projecting beyond the periphery thereof.

Another object of the invention is to provide a wheel having traction lugs secured thereto in a novel and efficient manner.

Still another object is to provide novelly constructed traction lugs for use on vehicle wheels.

A further object is to provide a novel all-metal wheel which may be readily and quickly adapted for efficient use on various types of traction surfaces.

A still further object is to provide a novel vehicle wheel which is constituted by a comparatively small number of light-weight, inexpensive parts and is durable and efficient in operation.

The above and further objects and novel features of the invention will more fully appear from the following detailed description when the same is read in connection with the accompanying drawing. It is to be expressly understood, however, that the drawing is for the purpose of illustration only and is not intended to define the limits of the invention, reference for this latter purpose being had primarily to the appended claims.

In the drawing wherein like reference characters refer to like parts throughout the several views, Fig. 1 is a side elevation of one form of wheel embodying the present invention and illustrating various positions of the traction lugs;

Figure 1:
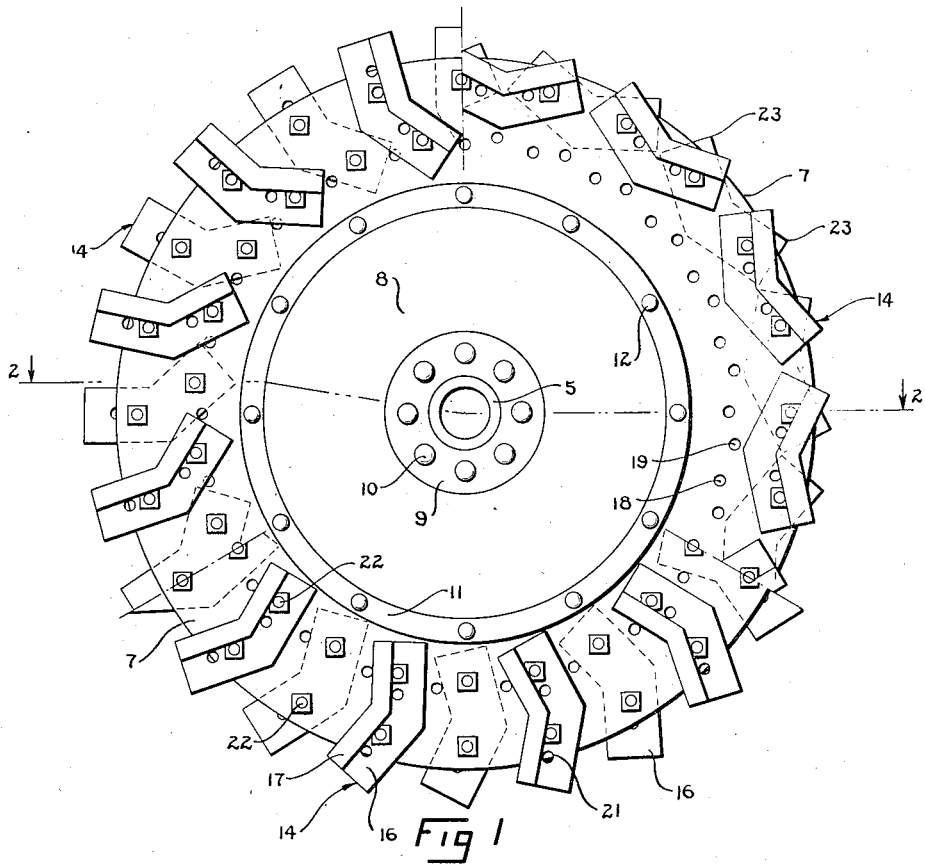
Figure 2:
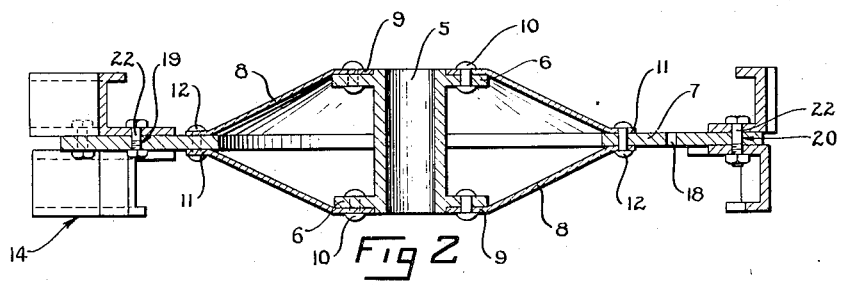
Fig. 2 is a sectional view taken substantially on line 2—2 of Fig. 1.

A single embodiment of the invention is shown in the drawing, by way of example, in the form of an all-metal, fabricated wheel which may be made for the most part from low-cost stampings and is adapted for use on vehicles, such as tractors. The novel wheel, as illustrated, comprises a cylindrical hub member 5 which has an annular external flange 6 adjacent each end thereof, said flanges preferably being integral with and, hence, part of said hub member. Surrounding the central portion of hub member 5 is a comparatively heavy, annular disc-like member or ring 7 which is provided with suitably positioned perforations to permit of the attachment of novel traction lugs to be hereinafter fully described. Ring 7 constitutes, in effect, the rim of the wheel, the same being comparatively thin in an axial direction and comparatively wide in a radial direction and the flat surfaces thereof being substantially perpendicular to the axis of the wheel.

Hub 5 and rim 7 are connected together in a novel manner to insure the rigidity and strength of the wheel in both an axial and a radial direction. The connecting means in the form shown comprises a pair of annular, sheet-metal discs 8. Inner peripheral margins 9 of said discs are bent inwardly to lie flat against the faces of flanges 6 and are secured to the latter by any suitable means, such as rivets 10. The outer peripheral margins 11 of discs 8 are bent in the reverse direction to lie flat against the opposite flat faces of rim 7 and are secured to the latter by rivets 12 or other suitable means, such as by bolts or by welding. The central portions of discs 8 thus extend in opposite directions at an angle to the axis of hub 5 and constitute braces which materially enhance the strength and rigidity of the wheel in an axial as well as in a radial direction.

Figure 3:
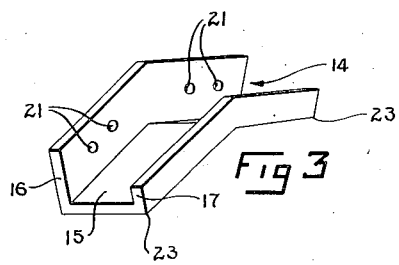
Fig. 3 is a detail isometric view of one of the novel traction lugs which may be employed in carrying out the invention.

Novel means are also provided by the present invention to insure proper traction between the above described wheel and supporting surfaces of various kinds having varying degrees of softness and texture. Said means in the form shown are constituted by a plurality of novelly constructed traction lugs 14 (Fig. 3) adapted to be mounted on rim 7 in several operable positions. Each of said lugs is constituted by a single piece of metal, such as a casting, having a V-shaped central portion 15, an inside flange 16 adapted to engage rim 7 and an outside flange 17, said flanges extending in the same direction from opposite edges of central portion 15 and at right angles thereto. Each of said flanges is preferably of a substantially uniform width in a radial direction and is V-shaped longitudinally, the same as portion 15. Accordingly, when lugs 14 are secured to rim 7 in a manner to be next described, the same are channel-shaped in a plane containing the axis of hub 5 and V-shaped in a plane perpendicular to said axis.

For the purpose of adjustably securing lugs 14 to rim 7 the latter is provided with three series of perforations or holes 18, 19 and 20 at different radial distances from the center of the wheel and flanges 16 of the traction lugs are provided with a plurality of bolt holes 21. Preferably, alternate lugs are circumferentially spaced from one another about the periphery of the wheel and are secured to rim 7 by means of bolts 22 which extend through rim 7 parallel to the axis of hub 5. The holes in rim 7 and in lugs 14 are so spaced that the latter may be removably secured to the former in each of at least three positions by two bolts 22. As shown at the bottom in Fig. 1, bolts 22 extend through holes 18 and 20 in rim 7 and through holes 21 in lugs 14 which register therewith, thus causing an end portion of each lug to extend beyond the periphery of the rim at an angle of approximately 30°. In the upper left sector of the wheel in Fig. 1 the inner circle of bolts extend through openings 19, thereby causing an end portion of each lug to extend radially from the periphery of rim 7. In the upper right sector of Fig. 1, lugs 14 are shown secured to rim 7 so that both corners 23 of each lug extend beyond the periphery of the rim. In the latter position the ends of adjacent lugs on opposite sides of rim 7 overlap and a single bolt extending through one of the openings 20 may be employed for securing said adjacent overlapping ends of the lugs to rim 7.

There is thus provided a novelly constructed metallic wheel which is rigid and durable and which has a very high strength factor per unit of weight. Also, the wheel provided by this invention may be very readily and quickly manufactured in large quantities at low cost. Additionally, the construction of the wheel is such that good and proper traction may be obtained in different kinds of soil without danger of the lugs becoming clogged with sod and hence of no material aid. Novelly constructed traction lugs which may be readily and quickly adjusted to various positions on the wheel or for different conditions of operation are also provided.

Although only a single embodiment of the invention has been illustrated and described in detail, it is to be expressly understood that the same is not limited thereto. For example, bolts and nuts may be employed in lieu of rivets 10, 12 or discs 8 may be welded in place on flanges 6 and rim 7, if desired. Various other changes may also be made, such as in the design and arrangement of parts illustrated, without departing from the spirit and scope of the invention as the same will now be understood by those skilled in the art. For a definition of the limits of the invention, reference is had primarily to the appended claims.

What is claimed is:

1. In a wheel for tractors and like vehicles, a traction lug having a channel-shaped transverse cross-section and a V-shaped longitudinal cross section the angle between the arms of said V-shape being an obtuse angle less than 180 degrees.

2. A wheel comprising a hub, a disc-like rim surrounding said hub and having the flat surfaces thereof substantially perpendicular to the axis of said hub, means connecting said rim to said hub and traction lugs secured to said rim adjacent the periphery thereof, each of said lugs being channel-shaped in axial cross-section and V-shaped in radial cross-section.

LOWELL V. LANDGREEN.